United States Patent
Day et al.

[15] 3,658,034
[45] Apr. 25, 1972

[54] GROWING TANK FOR CRUSTACEANS

[72] Inventors: John J. Day; Paul S. Hirschman, both of Fort Lauderdale, Fla.

[73] Assignee: Ocean Protein Corporation, New York, N.Y.

[22] Filed: Dec. 24, 1969

[21] Appl. No.: 887,819

[52] U.S. Cl. .................................................. 119/2, 119/4
[51] Int. Cl. .................................................. A01k 61/00
[58] Field of Search .................................................. 119/2–5

[56] References Cited

UNITED STATES PATENTS

| | | | |
|---|---|---|---|
| 2,804,045 | 8/1957 | Scott | 119/2 |
| 2,984,207 | 5/1961 | Drake | 119/2 |
| 3,086,497 | 4/1963 | Novello | 119/2 |
| 3,216,395 | 11/1965 | Girard | 119/3 |
| 2,981,228 | 4/1961 | Brandano | 119/2 |
| 3,255,731 | 6/1966 | Girard | 119/3 |
| 3,294,061 | 12/1966 | Hanks | 119/4 |
| 3,122,126 | 2/1964 | Yamada | 119/3 |
| 3,196,833 | 7/1965 | Glancy | 119/4 |
| 3,540,414 | 11/1970 | Maloney, Jr. | 119/2 |
| 3,477,406 | 11/1969 | Fujinaga | 119/2 |

*Primary Examiner*—Aldrich F. Medbery
*Attorney*—Darby & Darby

[57] ABSTRACT

A tank apparatus and method for providing optimum conditions for the growth and maturation of crustaceans during the post-larval period. A series of interconnecting tanks is provided. Habitats are positioned in each growing tank to promote the growth of the post-larval crustaceans. The water environment in each tank is continuously changed to remove waste materials from the tank, thereby promoting growth of the crustaceans. The temperature of the water environment is also maintained at an optimum level to further such growth. A method for optimizing the growth of crustaceans during the post-larval stage to adult life.

30 Claims, 6 Drawing Figures

PATENTED APR 25 1972

INVENTORS
JOHN J. DAY
PAUL S. HIRSCHMAN
BY
Kenyon & Kenyon
ATTORNEYS

PATENTED APR 25 1972 3,658,034
SHEET 2 OF 2
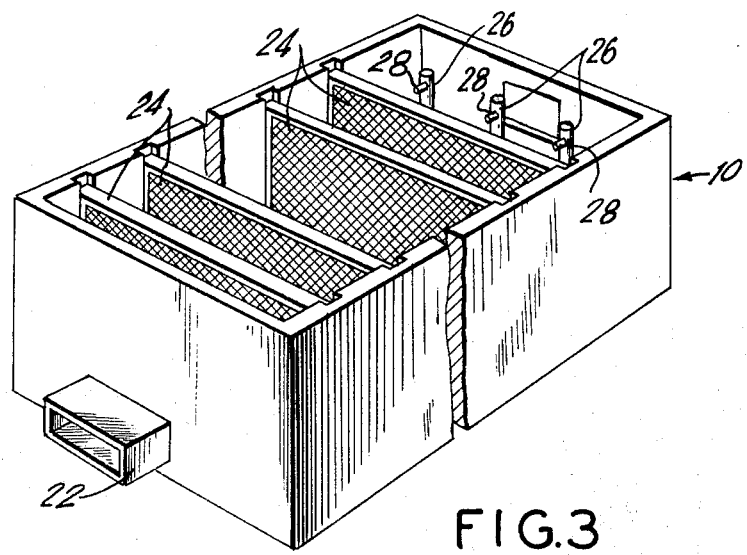
FIG.3
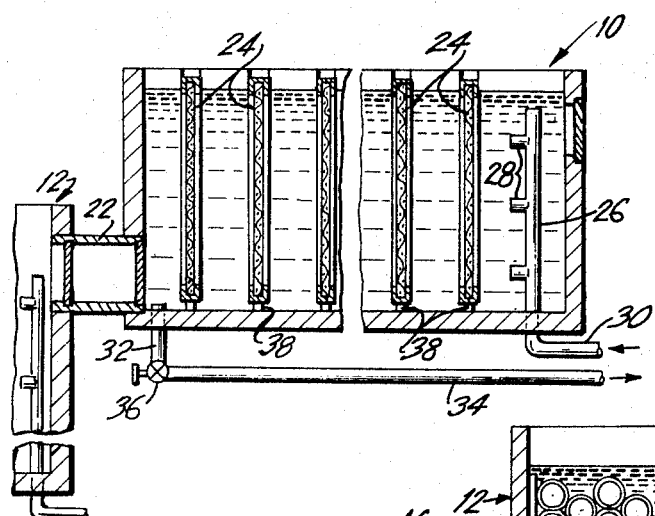
FIG.4
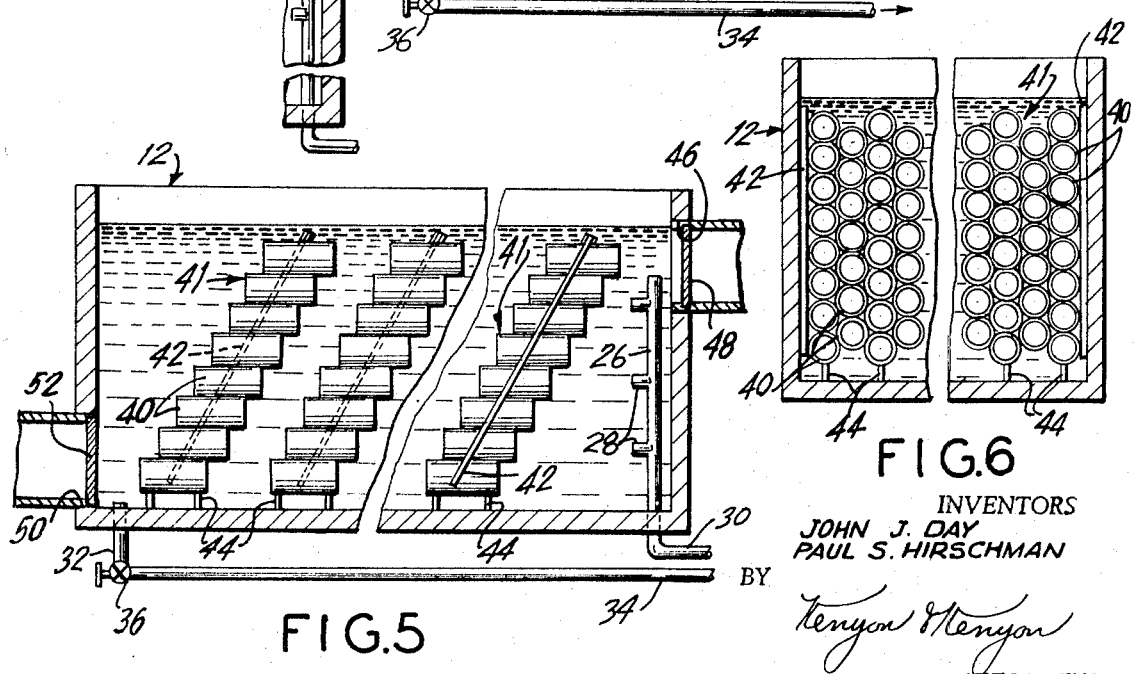
FIG.5
FIG.6
INVENTORS
JOHN J. DAY
PAUL S. HIRSCHMAN
BY Kenyon & Kenyon
ATTORNEYS

GROWING TANK FOR CRUSTACEANS

BACKGROUND OF THE INVENTION

1. Field of the Invention

This invention relates to the field of the husbandry of crustaceans and particularly relates to an apparatus and method for optimizing the growth of crustaceans during the post-larval to adult periods.

2. Description of the Prior Art

Prior art techniques in the husbandry of crustaceans are generally primitive in nature. A widely used method of growing crustaceans is to place a large number of crustaceans in a closed body of water such as a pond, allowing the crustaceans to breed and grow and harvesting adult crustaceans from time to time. Although this method is advantageous in that it provides a degree of control over the growing and harvesting of the crustaceans, a number of problems have arisen.

Certain crustaceans, especially cari dean shrimp, tend to be quite cannibalistic and territorial in nature. Unless the individual crustacean is provided with sufficient territorial space within which to grow and mature, the crustaceans will attack and eat each other.

It is thus an object of the present invention to provide apparatus and method for enabling large quantities of crustaceans to grow and mature to adulthood while minimizing cannibalism.

Where large numbers of crustaceans are growing and maturing within a confined area, a large quantity of waste products is produced by the crustaceans. Unless these waste products are removed from the crustaceans' water environment, the growth of the crustaceans will be retarded. Where crustaceans are grown in a confined body of water such as a pond, removal of waste material is impractical. It is thus desirable that waste material be removed in order to optimize growth of the crustaceans within the shortest period of time.

It is another object of the present invention to provide apparatus and method for optimizing the growth of crustaceans through the continuous removal of waste material from the water environment inhabited by the crustaceans.

It has been found that in the early post-larval period, growth of crustaceans is critically affected by the temperature of the water environment and sharp fluctuations in such temperature. Although the effect of temperature and fluctuations thereof diminishes as the crustaceans mature, it is still desirable to maintain a constant temperature during the entire growth cycle.

It is still another object of the present invention to provide apparatus and method for maintaining the temperature of the water environment of the crustaceans at a constant level and with as few fluctuations thereof as possible.

Where crustaceans are permitted to develop and mature in a pond, harvesting of adult crustaceans is often difficult. In order to make husbandry of crustaceans more efficient it is desirable that crustaceans be systematically harvested when they have reached maturity.

It is still another object of the present invention to provide apparatus and method for systematically growing and harvesting crustaceans.

SUMMARY OF THE INVENTION

This invention comprises apparatus and method for providing the optimum environment for the growth and maturation of crustaceans during the post-larval to adult periods. The apparatus comprises a series of interconnected tanks, each of which contains a plurality of habitats for crustaceans. The first tank is adapted to provide an environment for the initial post-larval stage of the crustaceans, and this tank contains a plurality of vertical screens, which constitute the habitats for the crustaceans. Succeeding tanks contain habitats which comprise individual lengths of cylindrical pipes arranged in vertically slanted racks, which are removable from the tanks.

Water, maintained at an optimum desired temperature, is continually circulated throughout each tank to dispose of waste materials. When the crustaceans in a given tank have attained a given size, they are removed to the next tank by permitting the water from one tank to cascade into the next succeeding tank. To facilitate this each tank is preferably positioned at a lower height than the preceding tank.

DESCRIPTION OF THE DRAWINGS

FIG. 3 is an isometric view of a growing tank of this invention for crustaceans in the initial post-larval stage showing habitats for crustaceans as vertically disposed screens within the tank.

FIG. 4 is a side sectional view of the tank of FIG. 3.

FIG. 5 is a side sectional view of a growing tank of the present invention for crustaceans after the initial post-larval stage showing the habitat for crustaceans as segments of cylindrical pipe vertically stacked at diagonals within the tank.

FIG. 6 is a front sectional view of the embodiment of FIG. 5.

DESCRIPTION OF THE INVENTION

Figure 1:
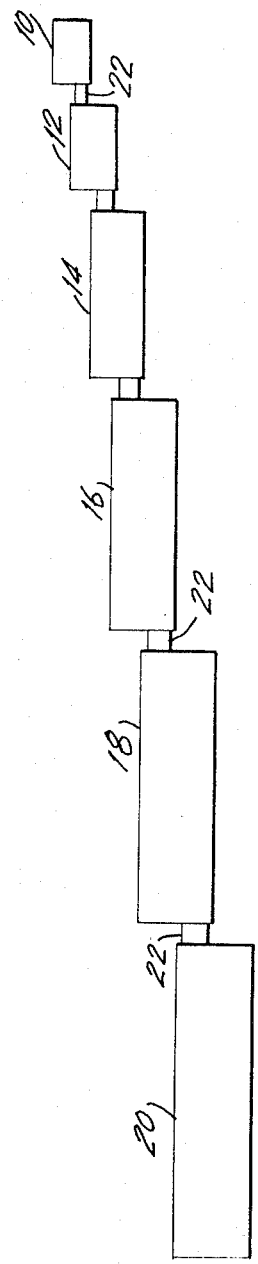
FIG. 1 is a schematic elevation view of one embodiment of the apparatus of the present invention showing a series of cascaded growing tanks.
Figure 2:
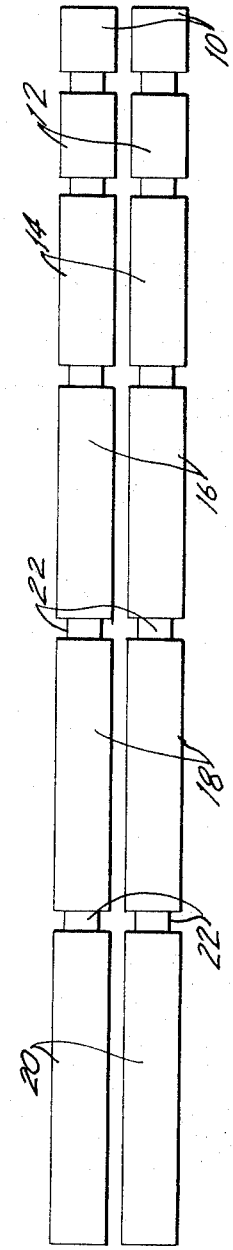
FIG. 2 is a plan view of the apparatus of the present invention shown in FIG. 1.

The apparatus of the present invention as shown in FIGS. 1 and 2 comprises a plurality of cascaded growing tanks 10, 12, 14, 16, 18, 20. Each succeeding tank is displaced lower in height than the preceeding tank in order to permit emptying of the contents of the preceeding tank thereinto. Thus, tank 12 is shown positioned lower than tank 10, tank 14 positioned lower than tank 12, and so on. Interconnection between tanks is provided by means of conduits or pipes 22 extending between adjacent tanks. Although pairs of side-by-side tanks are shown for each stage, any number of tanks positioned side-by-side may be utilized. In such case and for greatest efficiency, the same number of side-by-side tanks should be provided at each stage of the series of tanks.

In order to accommodate the increasing size of the crustaceans during post-larval maturation, it is desirable that each successive tank be larger than the preceding tank. The necessity for this successive increase in size of the tanks will be appreciated from the fact that in the initial post-larval stage an individual crustacean may be only one-third of an inch long whereas when the crustacean is fully matured it may be up to 10 inches long. This difference in the size of the crustacean from the initial post-larval to the adult stage also necessitates the provision of a different mode of habitat for the crustacean in the initial post-larval growing tank.

As shown in FIGS. 3 and 4, growing tank 10 is adapted to provide for growth of crustaceans during this initial post-larval period. To this end tank 10 is provided with a plurality of vertically disposed screens 24 which serve as habitats for crustaceans introduced into tank 10. Screens 24 rest on stand-offs 38, thus permitting flow of water around the screens as well as through the mesh of the screen. Water is introduced into tank 10 by means of pipes 26 having outlets 28. Pipe 26 are connected to a supply pipe 30. Water is drained from tank 10 by means of standpipes 32 connected to drainpipe 34 by means of valves 36. In this manner a continuous circulation of water between pipes 26 and pipes 32 is provided. Screens 24 are positioned in tank 10 so that their longitudinal axes are transverse to the direction of water flow. In this manner, water passes through the screens to carry off waste material. Tank 10 is further provided with outlet pipe 22 which permits draining of tank 10 into the next growing tank 12.

Screens 24 greatly increase the surface area provided for crustaceans to mature as compared to the surface area of a tank not provided with such screens. In this manner, substantially larger quantities of crustaceans may be accommodated in each tank. When crustaceans are introduced into the tank they will crawl up the screens and occupy a position on the screen—s surface. This position will serve as an area within which each crustacean may grow, free from the fear of being attacked by other crustaceans. The dimensions of the screens will be largely dictated by the inner dimensions of tank 10. The screen may be of any suitable material, although it is preferable that such material be impervious to the corrosive effects of the water environment in the tank. Such a non-corrosive material, for example, is fiberglass. The mesh openings of the screen material may be any suitable size, such as that of common household window screens.

FIGS. 5 and 6 show the growing tank of the present invention as used in the successive stages of growth after the initial post-larval period. Tank 12 is provided with supply pipes 26 and standpipes 32 to provide continual circulation of water in the tank. Positioned within the tank are habitats comprising stacks of segments 40 of cylindrical pipe arranged with their longitudinal axis aligned with the longitudinal axis of the tank. As will be explained hereinafter, in each vertical stack the pipes are diagonally stepped and rigidly secured one to the other to form a single rigid unit 41. Pipe segments 40 may be of any suitable cross-sectional shape and of any suitable material. However, it is preferable that such material have non-corrosive properties, such as has fiberglass, polyethylene, polyvinyl-chloride or the like. Each unit 41 rides on diagonally disposed tracks 42 and rests on stand-offs 44. A plurality of such units are preferably provided in each tank to increase the number of crustaceans which the tank is capable of holding while permitting each crustacean to grow protected from every other crustacean.

Tank 12 is further provided with inlet opening 46 which is closed off by gate 48 and with an outlet opening 50 which is closed off by gate 52.

Each successive tank 14, 16, 18 and 20 is preferably constructed in the same manner as tank 12. In order to accommodate the increasing size of the crustaceans during the maturation period each successive tank is preferably larger in size and is provided with pipe segments 40 of successively greater diameter and length.

In order to use the apparatus and method of the present invention, post-larval crustaceans, such as the fresh water shrimp species Macrobrachium carcinus, are first introduced into the tank 10. Such introduction may be accomplished by pumping the post-larval crustaceans from a hatching tank where the crustaceans have undergone a metamorphosis from the larval to post-larval stage.

The post-larval crustaceans are introduced into tank 10 in a water environment. Upon introduction the crustaceans spread throughout the water environment and each crustacean seeks out a space which will be its habitat where it can mature protected from the other crustaceans in the tank. Since the post-larval crustacean is essentially a crawler and not a swimmer the crustacean will crawl up the mesh material of screens 24 to locate a space for its habitat. The crustacean will cling vertically to the surface of the screen during maturation in tank 10.

Once establishing its habitat, the crustacean will remain there except to obtain food which may have fallen to the bottom of the tank. In such case, the crustaceans will recognize the bottom of the tank as a neutral territory and will not attack one another during recovery of food. Since many crustaceans have a homing instinct, each may return to the space which he had established as a habitat.

The vertically disposed screens increase the stocking density of the tank by greatly increasing the surface area available for crustaceans to establish habitats. The vertically hanging screens 24 are spaced as closely together as possible to maximize the number of crustaceans which may be matured in the tank. Being spaced closely together, the vertical screens simulate the natural water environment of shrimp, wherein closely spaced fronds are disposed in the water, thus providing darkness and creating a feeling of security in the maturing crustaceans. It has been found that the growth of crustaceans such as shrimp is greatly impaired if the shrimp does not feel secure and protected from danger. By permitting each crustacean to establish its habitat in a dark and protected space, the growth rate of the crustacean is greatly increased, thus maximizing production of the crustaceans.

It has been found that waste materials and uneaten food building up within the water environment of the tank retards growth of the crustaceans. It has also been found that crustaceans grow, especially in the initial post-larval stage, at an optimal water temperature and that major fluctuations in the water temperature retard growth and may even kill the maturing crustaceans.

In order to optimize growth of the crustaceans, water maintained at a constant temperature is slowly circulated through tank 10 by means of pipes 26 and 32. The specific temperature to be maintained will vary according to the specific species of crustaceans being grown in the tank.

After the crustaceans have been allowed to mature in tank 10 for a period of approximately two months, they will have grown to about 1 inch in length and will have outgrown their habitats in tank 10 and thus will be ready for transfer to tank 12. Transferral is brought about by lifting the screens from the water, thus forcing the crustaceans to move from their habitats on the screen into the water.

The outlet of tank 10 is then opened and the water and crustaceans will pass through pipe 22 into the next succeeding tank 12.

After tank 10 has been emptied out, screens 24 may be replaced after they have been cleaned. The outlet of tank 10 is closed and the tank is ready to receive a new group of post-larval crustaceans.

When the crustaceans coming from tank 10 have entered tank 12 they will again seek out individual areas to establish as habitats where they will feel protected during their next stage of growth. Being territorial by nature, they will defend their habitats against other crustaceans. In tank 12 habitats are provided by pipe segments 40. As with screens 24 of tank 10, segments 40 provide a dark space wherein the crustaceans can feel protected during maturation. This feeling of security, as noted above, greatly increased the growth rate of the crustaceans.

A unit 41 of pipe segments 40 is diagonally stepped in order to permit the crustaceans to crawl from the bottom of the tank to upper uninhabited habitats.

Stand-offs 44 space a unit of habitats or segments 40 from the bottom of the tank so that crustaceans will not be crushed after the unit is replaced in the tank after cleaning and so that water may circulate both through and around the segments 40.

As in tank 10, pipes 26 and 32 provide circulation of water at a substantially constant temperature in order to eliminate waste materials from the crustaceans' environment and thereby optimize growth of the crustaceans. Although maintenance of the temperature of the water at a predetermined level is not as critical at these later stages of development of the crustaceans as during the initial post-larval stage, it is still desirable to keep the water at an optimum temperature level and to minimize fluctuations in such temperature for maximum growth.

When the crustaceans have outgrown their habitats in tank 12 they are transferred to tank 14 by removing the units of pipe segments from the tank and tipping them at a 90° angle to force the crustaceans into the water. Gate 52 is then opened and the crustacean-filled water is cascaded through outlet opening 50 into the next succeeding tank 14.

Gate 52 is then closed and units 41 replaced in tank 12 after they have been cleaned. Tank 12 is now ready to receive another batch of crustaceans from tank 10 through inlet opening 46 after gate 48 has been removed.

Pipes 26 and 32 and the longitudinal axis of segments 40 are so positioned that the direction of flow of water will be through the length of segments 40.

The crustaceans are successively matured in tanks 14, 16, 18 and 20 and ultimately harvested from tank 20 when they have reached full maturity. As indicated hereinabove, the diameter and length of segments 40 are successively increased in the tanks in order to accommodate the increased size of the crustaceans.

In practice, the crustaceans in tank 20 are first harvested. Tank 20 is cleaned and tank 18 is then emptied into tank 20. After tank 18 has been cleaned, tank 16 is emptied into tank 18 and each succeeding tank up to tank 10 is emptied into the next tank.

It is thus seen that apparatus and method for growing crustaceans are provided wherein successive batches of crustaceans are permitted to grow free from cannibalistic threat and in optimum water environment. By cascading growing tanks, continuous production of large quantities of crustaceans is provided in a simple and efficient manner.

Although rectangularly shaped tanks have been described it will be understood that other configurations such as round, oval and the like are considered to be within the scope of the present invention. Similarly, the geometrical shape of pipe segments 40 and the pattern of screen 24 may be varied from that shown and described.

Although it is desirable that successive growing tanks be positioned at lower levels than the next preceding tanks in order to facilitate transfer of crustaceans from one tank to the next, the tanks may be at one level and other means such as pumps provided to bring about transfer between tanks.

What is claimed is:

1. Apparatus to provide a suitable environment for the maturation of crustaceans during the post larval period comprising at least one fluid containing tank, and means within said tank for providing respective individual habitat enclosures for at least one of said crustaceans, said habitat means including means having a multiplicity of members which extend into the fluid of said tank from a common support and into and upon which the individual crustacean can crawl to seek a respective territory to establish an individual habitat, said members of said habitat means being spaced and aligned for defining a means permitting the fluid in the tank to flow through and around said habitat means.

2. Apparatus as in claim 1 further comprising a plurality of said habitat means in said tank.

3. The apparatus of claim 2 wherein said members of said means for providing said habitat enclosures comprise means forming a plurality of compartments which are open at both ends thereof and which provide an unobstructed passage from one end of the other, each compartment forming a said habitat enclosure, said compartment forming means arranged to permit a crustacean to crawl from one compartment to another.

4. The apparatus of claim 1 including means for continuously circulating a water environment in said tank.

5. The apparatus of claim 3, including means for maintaining the water environment in said tank at a substantially constant temperature.

6. The apparatus of claim 4 wherein said circulating means comprises standpipe and drainpipe means for maintaining a predetermined level of liquid in said tank.

7. The apparatus of claim 1 wherein said members of said means for providing said habitat enclosures comprises means forming a plurality of compartments which are open at both ends thereof, each compartment forming a said habitat enclosure, said compartment means arranged to permit a crustacean to crawl from one compartment to another.

8. The apparatus of claim 7 wherein said compartment forming means includes a plurality of members secured together to form a unit in which said compartments are substantially vertically slanted, and including means for mounting said unit in said tank.

9. The apparatus of claim 7 including means for continuously circulating water maintained at a substantially constant temperature within said tank and wherein the longitudinal axes of said compartments are aligned with the direction of flow of said water.

10. The apparatus of claim 3 wherein said compartment forming means includes a plurality of members in said tank which are secured together to form a unit in which said compartments are substantially vertically slanted, and including means for mounting said unit in said tank.

11. The apparatus of claim 3 including means for continuously circulating water maintained at a substantially constant temperature within said tank and wherein the longitudinal axes of said compartments are aligned with the direction of flow of said water.

12. Apparatus to provide a suitable environment for the maturation of crustaceans during the post-larval period comprising a plurality of tanks, means for successively interconnecting adjacent tanks, habitat means in each of said tanks to provide a plurality of respective territories in which at least one crustacean can mature, said habitat means in the first tank comprising a plurality of vertically disposed screens for providing the respective territories for at least one crustacean to mature during the initial post-larval period in each of the successive tanks, and said habitat means in each of said remaining tanks comprises a plurality of substantially horizontal pipe segments aligned in vertically slanted units of pipe segments rigidly secured together, each of said pipe segments providing a sheltered territory for one or more crustaceans to mature to adulthood after said initial post-larval period.

13. The apparatus of claim 12 wherein adjacent tanks are successively disposed at lower levels and including means for selectively emptying the contents of each tank into the next adjacent tank disposed at a lower level.

14. The apparatus of claim 12 including means for continuously circulating water at a substantially constant temperature in each of said tanks.

15. A method of maturing crustaceans from the post larval period comprising the steps of:
 a. introducing post larval crustaceans into a fluid environment of a first growing tank,
 b. providing a plurality of habitats of territorial area in said first growing tank to permit individual crustacea to occupy a habitat,
 c. maturing said crustacea in said first tank for a given time period,
 d. moving said crustacea from said first growing tank into a fluid environment of a second growing tank, after a predetermined period of maturation,
 e. providing in said second growing tank a plurality of open ended habitat enclosures of larger territorial area than the habitats of said first growing tanks to permit individual crustacea to occupy a habitat enclosure, the size of the territories of the respective habitats of said second growing tank being greater than the size of the territories of the habitats of said first growing tank, and
 f. maturing said crustacea in said second growing tank for a further period of time.

16. The method of claim 15 including the step of continuously circulating the fluid environment in said growing tanks and maintaining the fluids in each of said tanks at a substantially constant temperature.

17. The method of claim 15 in which said step of providing habitats comprises providing at least one mesh screen within said first growing tank, said screens providing the habitats for crustaceans to mature.

18. The method of claim 15 in which said step of providing habitat enclosures comprises providing a unit having a plurality of compartments in said second growing tank, each of said compartments providing an individual habitat for at least one crustacean during maturation.

19. Apparatus to provide a suitable environment for the maturation of crustaceans during the post larval period comprising at least one fluid containing tank, means in said tank forming a unit having a plurality of habitat compartments having means to permit access of the crustaceans thereto, which are arranged in rows, with a plurality of rows being stacked one above another.

20. Apparatus as in claim 19 wherein adjacent rows of habitat compartments are offset one from another to permit the crustaceans to crawl to different parts of said unit.

21. Apparatus as in claim 20 wherein each said habitat compartments is of a size to hold substantially only one crustacean.

22. Apparatus as in claim 19 further comprising a second fluid containing tank, means in said second tank forming a unit having a plurality of habitat compartments which are arranged in rows with a plurality of rows being stacked one above the other, the habitat compartments of the unit in said second tank being of a larger size than the habitat compartments of said unit in said one tank.

23. Apparatus as in claim 22 wherein adjacent rows of habitat compartments in each said unit are offset one from another to permit the crustaceans to crawl to different parts of each said unit.

24. Apparatus as in claim 19 wherein each of said habitat compartments is open at both ends thereof, means for circulating water within said tank, said unit being located within said tank so that the longitudinal axis of each respective compartment is aligned substantially in the direction of the water circulation.

25. Apparatus as in claim 19 wherein said habitat compartments are open at both ends thereof and are aligned to have all of the longitudinal axes thereof generally parallel.

26. Apparatus as in claim 20 wherein said habitat compartments are open at both ends thereof and are aligned to have all of the longitudinal axes thereof generally parallel.

27. Apparatus to provide a suitable environment for the maturation of crustaceans during the post-larval period comprising a plurality of fluid containing tanks, means for providing fluid interconnection between successive tanks, means in each said tank to provide an integral unit having a plurality of respective habitat enclosures in the form of compartments each defining a respective territory for at least one crustacean to mature, each of said compartments having means to permit access of the crustaceans thereto, the habitat means of each successive tank providing larger compartments and thereby larger territories than that of the preceding tank to provide for the maturation of larger crustaceans.

28. Apparatus as in claim 27 wherein said compartments are arranged in a plurality of rows stacked one atop another.

29. Apparatus as in claim 28 wherein adjacent rows of said compartments are offset one from another.

30. Apparatus as in claim 28 wherein said habitat compartments are open at both ends thereof and are aligned to have all of the longitudinal axes thereof generally parallel.

* * * * *